United States Patent Office 3,006,715
Patented Oct. 31, 1961

3,006,715
PROCESS OF SPINNING ACRYLONITRILE POLYMER FILAMENTS FROM SOLUTION OF DIMETHYL SULFOXIDE AND A NON-SOLVENT
Donald Joseph Lyman, Wilmington, Del., assignor to E. I. du Pont de Nemours and Company, Wilmington, Del., a corporation of Delaware
No Drawing. Filed Oct. 18, 1957, Ser. No. 690,900
4 Claims. (Cl. 18—54)

This invention relates to a new composition of matter and shaped articles produced therefrom. More particularly, this invention relates to an organic solvent solution of acrylonitrile polymers containing at least 85% by weight combined acrylonitrile and to the production of shaped articles from such a solution.

Polymers of acrylonitrile containing at least 85% combined acrylonitrile are well known fiber-forming materials. Such polymers, however, are difficult and expensive to form into fibers because of their slight solubility in most organic solvents. This necessitates the use of unusual and costly solvents, such as N,N-dimethylformamide, dimethylsulfoxide, and others. Indeed, the commercial production of fibers from acrylonitrile polymers was delayed many years before the discovery of such solvents. In addition to being costly known acrylonitrile polymer solvents have the disadvantage of having high-boiling points, so that spinning processes, especially dry spinning, must be conducted at elevated temperature, thereby adding appreciably to the cost of manufacture. The use of such high temperatures also makes it more difficult to obtain white fibers from such solutions, as it is known that such polymers discolor upon the application of excessive heat.

An object of this invention is to provide more economical spinning solutions from acrylonitrile polymers. A further object is to provide spinning solutions of acrylonitrile polymers that can be spun at appreciably lower temperatures than is now possible with the solvents of the prior art. Another object is to produce whiter fibers from the spinning of these novel solutions.

The objects of this invention are attained by dissolving a polymer of acrylonitrile containing at least about 85% by weight of combined acrylonitrile in a solvent medium comprising an organic compound which is a non-solvent for the polymer of acrylonitrile and which has a boiling point of between about 40° C. and about 150° C., preferably between about 50° C. and 120° C., and from about 40% to about 80% by volume of dimethylsulfoxide, to form a solution containing at least about 10% by weight of the acrylonitrile polymer. Best results are achieved in the higher range of dilution of the dimethylsulfoxide with the non-solvent; i.e., even lower spinning temperatures are possible and consequently, whiter fibers are produced. The following examples illustrate specific embodiments of the invention. All parts, percentages and proportions are by weight unless otherwise specified.

The expression "intrinsic viscosity" with the symbol (N) as used herein signifies the value of $1nN_r$ at the ordinate axis intercept (i.e., when $c$ equals 0) in a graph of $$\frac{1nN_r}{c}$$

as ordinate with $c$ values (grams per 100 ml. of solution) as abscissas. $N_r$ is a symbol for relative viscosity, which is the ratio of the flow times in a viscosimeter of a polymer solution and the solvent. The symbol ($1n$) is the logarithm to the base $e$. All measurements on polymers containing acrylonitrile are made with dimethylformamide solution at 25° C.

EXAMPLE I

Dimethylsulfoxide in the amount of 80 ml. is mixed with 20 ml. of acetone. A copolymer of acrylonitrile, methyl acrylate, and sodium styrene sulfonate (93.65/5.98/0.37) (intrinsic viscosity 1.5) in the amount of 1 gram is mixed with 4 ml. of the dimethylsulfoxide-acetone mixture. This mixture is then stirred at room temperature and heated on a hot plate to a temperature of 50° C. to form a clear viscous solution which is satisfactory for film casting.

This procedure is followed with each of the low-boiling organic compounds shown in Table I in combination with dimethylsulfoxide to give clear viscous solutions satisfactory for film casting.

Table I

| Compound | Boiling Points, °C. |
|---|---|
| Ketones: | |
| acetone | 56.5 |
| methyl ethyl ketone | 79.6 |
| 4-methylpentanone-2 | 115 |
| Ethers: | |
| diethyl ether | 34.6 |
| 1,2-dimethoxyethane | 42.3 |
| Cyclic Ethers: | |
| tetrahydrofuran | 65-66 |
| 1,3-dioxane | 105-106 |
| dioxolane (glycol methylene ether) | 75-76 |
| Nitriles: | |
| acetonitrile | 81.6 |
| Esters: | |
| ethyl acetate | 77.1 |
| n-amyl acetate | 103-104 |
| Halogenated Hydrocarbons: | |
| methylene chloride | 40-41 |
| carbon tetrachloride | 76.8 |
| Aromatic Hydrocarbons: | |
| benzene | 80.1 |
| toluene | 110.8 |

It is quite surprising that dimethylsulfoxide can be diluted with as much as 20% by volume of compounds that are non-solvents for the acrylonitrile polymer and still obtain very excellent solutions with a viscosity suited for spinning or casting.

Similar results are obtained with the homopolymer of acrylonitrile.

EXAMPLE II

The polymer of Example I in the amount of 50 grams is added to a mixture of 88 ml. dimethylsulfoxide and 88 ml. 4-methyl pentanone-2. This mixture is then stirred and heated from room temperature to 110° C. to form a clear viscous solution with a viscosity of 90 poises at 110° C. The solution is dry spun in a spinning cell about 6 inches in diameter by 11 feet in length, using an apparatus similar to that shown in U.S. Patent 2,615,198 issued to G. N. Flannagan. The spinneret contains 10 orifices, 0.005 inch in diameter.

A solution of the polymer of Example I is prepared in the same manner with other solvents including dimethylsulfoxide alone and mixtures of equal proportions by volume of dimethylsulfoxide with each of tetrahydrofuran and acetone. These resulting solutions are then dry spun utilizing the same apparatus as above. The character of the spinning solutions thus prepared and the spinning conditions for each solution and properties of the yarn produced are shown in Table II.

*Table II*

| Spinning Solution | | | Spinning Conditions | | | | | |
|---|---|---|---|---|---|---|---|---|
| Solvent | Percent Solids | Temperature to Dissolve, °C. | Temperature, °C. | | | | Speed (Yards per Min.) | As Spun Denier |
| | | | Head | Spinnerette | Air | Cell | | |
| Dimethylsulfoxide 100% | 26 | 50 | 118 | 122 | 142 | 180 | 163 | 10.4 |
| Dimethylsulfoxide/4-methyl pentanone-2, 50/50 | 21 | 105–110 | 110 | 110 | 120 | 150 | 198 | 6.6–8 |
| Dimethylsulfoxide/tetrahydrofuran, 50/50 | 22 | 55–65 | 80 | 80 | 110 | 150 | 137 | 12–13.6 |
| Dimethylsulfoxide/acetone, 50/50 | 25 | 47–52 | 50 | 66 | 108 | 150 | 167 | 11–12 |

The head temperature is the temperature of the spinning solution just before being extruded; the spinneret temperature is the surface temperature of the spinneret where it protrudes into the cell; the air temperature is the temperature of the air as it enters the top of the spinning cell around the spinneret at a rate of about 4 to 6 cubic feet per minute; the cell temperature is the inside surface temperature of the electrically heated spinning cell.

The spinning conditions for use with the pure dimethylsulfoxide represents the minimum temperatures that could be used in order that the solution could be spun at all. Reduction of any of these temperatures or use of faster spinning speeds at the temperatures given prevents the yarn from being wound up and collected in a suitable manner due to breaking of the thread line, filaments striking on cell wall and filaments fusing together on the windup wheel. It is very surprising that the other solutions, all of which contain a much smaller amount of solids and hence require the evaporation of the greater weight of the solvent, can all be spun at appreciably lower temperatures and satisfactory yarn produced.

Solutions with different contents of polymer are used in order that all solutions have the same viscosity. It is known that the spinning performance of a solution is very sensitive to its viscosity. All solutions spin well.

EXAMPLE III

The fibers of Example II are drawn 8× (i.e., to a length eight times the original length) in steam under a pressure of 10 p.s.i., the residual solvent being recovered from the steam cell condensate. The drawn filaments are then boiled in water, air dried and physical properties determined at 70° F. in 65% relative humidity. These properties are shown in Table III.

*Table III*

| Solvent | Tenacity at Break, Grams Per Denier | Elongation at Break, percent | Initial Modulus, Grams Per Denier |
|---|---|---|---|
| Dimethylsulfoxide, 100% | 5.2 | 28 | 67 |
| Dimethylsulfoxide/4-methyl pentanone-2, 50/50 | 4.0 | 22 | 56 |
| Dimethylsulfoxide/tetrahydrofuran, 50/50 | 5.0 | 31 | 58 |
| Dimethylsulfoxide/acetone, 50/50 | 4.7 | 29 | 59 |

Thus, spinning with mixed solvents permits commercial spinning at much lower temperatures and still gives first-quality yarn. The fibers prepared from the mixtures of dimethylsulfoxide and non-solvent are all significantly whiter; i.e., less yellow, than the fibers prepared from the solution in dimethylsulfoxide alone.

EXAMPLE IV

A mixture of 116 ml. of dimethylsulfoxide and 144 ml. of acetone is added to 60 grams of the polymer of Example I and stirred at 45–48° C. The resulting clear viscous solution (18.7% solids) is then extruded into 47° C. water and collected at 8.3 yards per minute, using a 100 hole spinneret (0.003 inch diameter orifices). The filaments are collected and drawn 6.5× in water at 95–98° C. to give filaments with a tenacity of 2.7 grams per denier and an elongation at the break of 12%.

Although the invention has been illustrated with the use of one particular polymer of acrylonitrile and the homopolymer of acrylonitrile, it is not limited thereto. Numerous monomers, including ethylenically unsaturated sulfonic acids such as methallyl sulfonic acids and others as disclosed in U.S. Patent 2,527,300, can be copolymerized with acrylonitrile, as disclosed in U.S. 2,436,926 to Jacobson and in U.S. 2,456,360 to Arnold, using the techniques of U.S. Patents 2,628,223 and 2,546,238. The present invention pertains to the homopolymers and copolymers of acrylonitrile generally, containing at least about 85% of combined acrylonitrile and of a molecular weight suitable for the formation of textile fibers.

Any organic non-solvent for acrylonitrile polymers having a boiling point between about 40° C. and about 150° C., and preferably between 50° C. and 120° C., which is miscible with dimethylsulfoxide can be used in this invention to give a solution of the polymer. Suitable solutions contain from about 20% to about 60% by volume of the non-solvent. Such added non-solvents, of course, should be chemically inert towards the polymer and towards the dimethylsulfoxide and preferably should be nontoxic for purposes of safe commercial production of fibers and films.

The class of organic non-solvents comprising ketones, cyclic ethers, nitriles and halogenated hydrocarbons is preferred for use in this invention. Particularly preferred are solutions comprising dimethylsulfoxide and acetone which have been found to have a greater tolerance for the acrylonitrile polymers, even at higher dilution of the dimethylsulfoxide with acetone.

Solutions of polymers of acrylonitrile formed by the mixed solvents of this invention are stable at room temperature (approximately 20° C.) and at temperatures considerably above room temperature. Shaped structures and articles can be produced by extruding such solutions into an evaporative or coagulative medium. Although the compositions of matter of this invention are particularly valuable in dry spinning where the lower spinning temperatures and/or faster spinning speeds provide a more economical process, it will be understood that they also can be used in wet spinning where the lower cost of the solvent renders the use of such mixed solvents desirable.

Use of a diluent miscible with the polymer solvent but immiscible with a wet-spinning coagulant; e.g., carbon-tetrachloride and dimethylsulfoxide in equal proportion, is useful for controlling the rate of diffusion of the coagulant into filaments, thereby controlling the fiber properties.

Shaped articles obtained from solvent solutions of polymers of acrylonitrile in accordance with this invention and from which the solvent is substantially removed are substantially free of foreign matter and bubbles and substantially undecomposed and chemically unchanged from the polymer prior to its solution.

It is very surprising that fibers spun from mixed solvents are free from bubbles, even though the spinning temperatures are well above the boiling point of the diluent, i.e., the non-solvent.

A solution of acrylonitrile polymer dissolved in the mixed solvents of this invention must be of such a concentration that its relative viscosity at the operating temperature is within a workable range. When it is to be employed in the spinning of yarn or in the casting of film, the solution should preferably have a viscosity between about 25 poises and about 750 poises. Generally, it is preferred that the spinning solution contain at least about 10% by weight of the polymer because of the difficulty in rapidly removing large amounts of solvent from the solution in the spinning operation. Moreover, it is economically undesirable to use such large amounts of solvent for the spinning of a given amount of polymer, although it is true that the solvent can be completely recovered from the spinning operation and reused. For these reasons, it is preferred to employ a polymer having an intrinsic viscosity between about 1.0 and about 2.0, since such a polymer forms a solution of the desired viscosity in concentrations of from about 15% to about 35% by weight at the spinning temperature (i.e., head temperature) of from about 50° C. to about 175° C. Of course, it is within the scope of this invention to heat the solution to a higher temperature for the actual spinning operation. Here again, the controlling factor with regard to the temperature of the spinning solution is the viscosity of the solution.

Fibers spun from the compositions of matter of this invention are useful where high tensile strength and durability to weather, ultraviolet light, moisture, and heat are desirable.

The claimed invention:

1. The process comprising the steps of admixing at least 10% by weight of a polymer of acrylonitrile containing at least about 85% by weight of combined acrylonitrile in a mixed solvent medium comprising from about 40% to about 80% by volume of dimethyl sulfoxide and an organic non-solvent for the acrylonitrile polymer having a boiling point between about 40° C. and 150° C. selected from the group consisting of acetone, methyl ethyl ketone, 4-methylpentanone-2, diethyl ether, 1,2-dimethoxyethane, tetrahydrofuran, 1,3-dioxane, dioxolane, acetonitrile, ethyl acetate, n-amyl acetate, methylene chloride, carbon tetrachloride, benzene, and toluene, dissolving said polymer in said solvent medium by heating the mixture to form a solution containing at least about 10% by weight of the acrylonitrile polymer and having a viscosity between about 25 and about 750 poises, and spinning the solution into a filament at a temperature substantially less than that required for spinning a solution of the same acrylonitrile polymer in dimethyl sulfoxide and having substantially the same viscosity as the solution of the polymer in the mixed solvent medium.

2. The process comprising the steps of dissolving a polymer of acrylonitrile containing at least about 85% by weight of combined acrylonitrile in a mixed solvent medium comprising from about 40% to about 80% by volume of dimethyl sulfoxide and an organic non-solvent for said acrylonitrile polymer having a boiling point between about 40° C. and about 150° C. selected from the group consisting of acetone, methyl ethyl ketone, 4-methylpentanone-2, diethyl ether, 1,2-dimethoxy-ethane, tetrahydrofuran, 1,3-dioxane, dioxolane, acetonitrile, ethyl acetate, n-amyl acetate, methylene chloride, carbon tetrachloride, benzene, and toluene to form a solution comprising at least about 10% by weight of said acrylonitrile polymer and having a viscosity between about 25 and 750 poises, and spinning the solution into filaments at a spinneret temperature of from about 50° C. to about 175° C., said temperature being between about 10° and about 70° below the minimum temperature required for spinning a solution of the same acrylonitrile polymer in dimethyl sulfoxide and having substantially the same viscosity as the solution of the polymer in the mixed solvent medium.

3. The process comprising the steps of dissolving a polymer of acrylonitrile containing at least about 85% by weight of combined acrylonitrile in a mixed solvent medium comprising dimethyl sulfoxide and from about 20% to about 60% by volume of an organic non-solvent for the acrylonitrile polymer having a boiling point between about 40° C. and about 150° C. selected from the group consisting of acetone, methyl ethyl ketone, 4-methylpentanone-2, diethyl ether, 1,2-dimethoxyethane, tetrahydrofuran, 1,3-dioxane, dioxolane, acetonitrile, ethyl acetate, n-amyl acetate, methylene chloride, carbon tetrachloride, benzene, and toluene to form a solution containing at least about 10% by weight of the acrylonitrile polymer and having a viscosity between about 25 and about 750 poises, and spinning the solution into filaments at a temperature in excess of the boiling point of the organic non-solvent, said temperature being substantially less than that required for spinning a solution of the same acrylonitrile polymer in dimethyl sulfoxide and having substantially the same viscosity as the solution of the polymer in the mixed solvent medium.

4. The process of claim 3 wherein the solution contains from about 15% to about 35% by weight of acrylonitrile polymer.

References Cited in the file of this patent

UNITED STATES PATENTS

| | | |
|---|---|---|
| 2,657,191 | Coover et al. | Oct. 27, 1953 |
| 2,682,518 | Caldwell | June 29, 1954 |
| 2,776,947 | Schildknecht | Jan. 8, 1957 |
| 2,779,746 | Heisenberg et al. | Jan. 29, 1957 |
| 2,858,288 | Ehlers | Oct. 28, 1958 |